United States Patent [19]

Naidu

[11] Patent Number: 5,214,371
[45] Date of Patent: May 25, 1993

[54] VOLTAGE REGULATOR FOR VARIABLE SPEED PERMANENT MAGNET ALTERNATORS

[75] Inventor: Malakondaiah Naidu, Troy, Mich.

[73] Assignee: General Motors Corporation, Detroit, Mich.

[21] Appl. No.: 802,177

[22] Filed: Dec. 4, 1991

[51] Int. Cl.$^5$ .............................................. H02J 7/14
[52] U.S. Cl. ........................................ 322/29; 322/28
[58] Field of Search ................ 322/25, 27, 28, 29, 322/32, 59, 73, 89, 90, 93, 94; 307/16

[56] References Cited

U.S. PATENT DOCUMENTS

| | | | |
|---|---|---|---|
| 3,353,090 | 11/1967 | Sawyer | 322/30 |
| 3,369,170 | 2/1968 | Custer | 322/28 |
| 3,400,318 | 9/1968 | Hill | 320/41 |
| 3,427,529 | 2/1969 | Cummins et al. | 363/87 |
| 3,443,197 | 5/1969 | Raver et al. | 363/87 |
| 3,636,434 | 1/1972 | Beuk et al. | 322/28 |
| 3,689,826 | 9/1972 | Cherry | 322/29 |
| 3,694,731 | 9/1972 | Cherry | 322/29 X |
| 3,923,765 | 1/1976 | Townsend | 322/29 X |
| 4,195,256 | 3/1980 | Carmichael | 322/90 |
| 4,197,492 | 4/1980 | Sato et al. | 322/28 |
| 4,419,618 | 12/1983 | Gretsch | 322/29 X |
| 4,431,959 | 2/1984 | Remmers | 320/59 |
| 4,442,396 | 4/1984 | Hucker | 322/28 X |
| 4,686,442 | 8/1987 | Radomski | 322/90 X |
| 4,777,425 | 10/1988 | MacFarlane | 322/28 |
| 4,827,393 | 5/1989 | Clark | 322/28 X |
| 5,057,763 | 10/1991 | Torii et al. | 322/29 X |

FOREIGN PATENT DOCUMENTS

| | | | |
|---|---|---|---|
| 2231576 | 1/1974 | Fed. Rep. of Germany | 322/93 |
| 0032400 | 2/1984 | Japan | 322/28 |
| 1480083 | 5/1989 | U.S.S.R. | |

Primary Examiner—Emanuel T. Voeltz
Assistant Examiner—Kristine Peckman
Attorney, Agent, or Firm—Creighton R. Meland

[57] ABSTRACT

A voltage regulating system for a permanent magnet alternating current generator that has a rotor and a three phase Y-connected output winding. The system has first and second three phase full wave bridge rectifiers each comprised of a plurality of controlled rectifiers. The ends of the phase windings of the output winding are connected to the AC input terminals of the first bridge rectifier. The phase windings are connected to taps and these taps are located between the neutral and the ends of the phase windings. The taps are connected to the AC input terminals of the second bridge rectifier. The first bridge rectifier is enabled and the second bridge rectifier is disabled at speeds of rotation of the rotor below a predetermined speed. At rotor speeds above the predetermined speed, the first bridge rectifier is disabled and the second bridge rectifier is enabled.

12 Claims, 1 Drawing Sheet

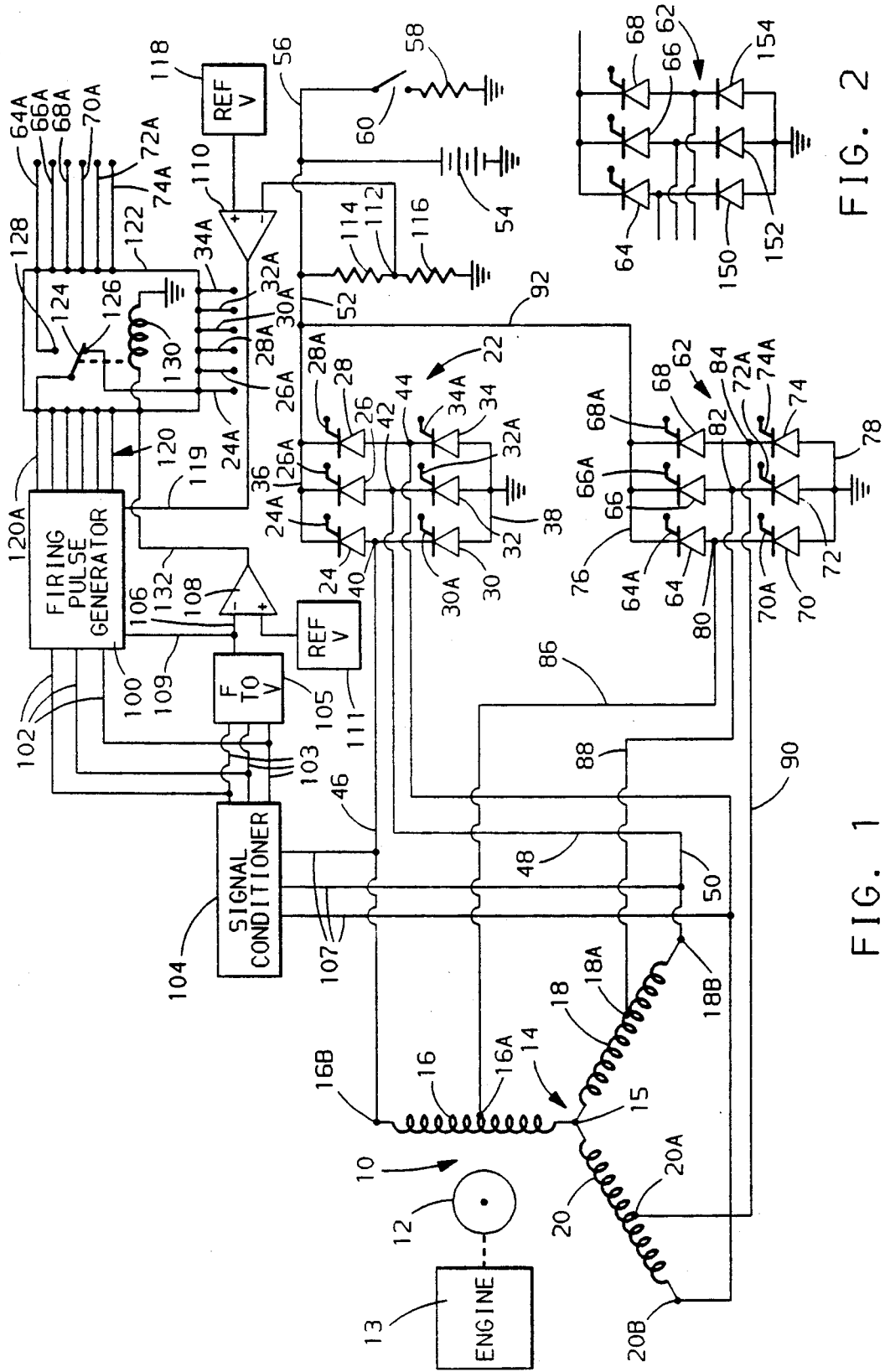

VOLTAGE REGULATOR FOR VARIABLE SPEED PERMANENT MAGNET ALTERNATORS

This invention relates to voltage regulating apparatus for variable speed permanent magnet alternating current generators.

Voltage regulator systems for permanent magnet alternating current generators are known, examples being the systems disclosed in the U.S. Pat. Nos. to Raver et al 3,443,197, to Custer 3,369,170 and to Cummins et al U.S. Pat. No. 3,427,529. In the systems of these patents the output or stator winding of a permanent magnet alternator is connected to a bridge rectifier that is comprised of controlled rectifiers and diodes. By turning the controlled rectifiers ON and OFF as a function of the output voltage of the bridge rectifier, the direct output voltage of the bridge rectifier is maintained substantially constant.

One of the problems associated with the systems of the type disclosed in the above-referenced patents is that these systems have high copper losses in the stator winding and poor power factor at high rotor speed.

It accordingly is one of the objects of this invention to provide a voltage regulating circuit for a variable speed permanent magnet alternating current generator which reduces the copper loss in the stator or output winding of the generator and improves the power factor at high rotor speed. This is accomplished by providing a stator or output winding that is comprised of two sets of windings. The first winding set has a larger number of turns than the second winding set. The first winding set is connected to a first bridge rectifier that has a plurality of controlled rectifiers and the second winding set is connected to a second bridge rectifier that has a plurality of controlled rectifiers. The system is arranged to enable the first bridge rectifier and disable the second bridge rectifier when the speed of the rotor of the generator is below a predetermined speed. At rotor speeds above the predetermined speed, the second bridge rectifier is enabled and the first bridge rectifier is disabled. Both bridge rectifiers feed a direct voltage load which may be the battery or other loads in a motor vehicle electrical system. The output voltage of the bridge rectifiers is sensed and the system controls the conduction angle of the controlled rectifiers as a function of the sensed bridge rectifier output voltage to maintain the output voltage of the bridge rectifier that is enabled substantially constant.

Another object of this invention is to provide a system of the type described where the first winding set is provided by generator phase windings and where the second winding set is provided by portions of the phase windings that are connected to taps on the phase windings.

Still another object of this invention is to provide a system of the type described where the bridge rectifiers are selectively enabled or disabled by applying or cutting-off the gate signals to or from the gates of the controlled rectifiers of the bridge rectifiers.

IN THE DRAWINGS

FIG. 1 is a circuit diagram of a voltage regulating system made in accordance with this invention.

FIG. 2 illustrates a modified bridge rectifier that can be used in the system of FIG. 1.

Referring now to FIG. 1, the reference numeral 10 designates a permanent magnet alternating current generator that has a rotor 12 and a three-phase Y-connected output or stator winding 14. The rotor 12 is driven at a variable speed by an engine 13 on a motor vehicle. The rotor 12 has permanent magnets (not illustrated) and as it rotates an alternating voltage is induced or generated in output winding 14. The frequency of the alternating voltage generated in winding 14 is directly proportional to the speed of rotation of rotor 12. Further, the magnitude or amplitude of this voltage is a function of rotor speed, that is, as rotor speed increases the amplitude of the voltage increases and vice-versa. Output winding 14 has a neutral 15 and is comprised of phase windings 16, 18 and 20. Each phase winding has a tap which are designated respectively as 16A, 18A and 20A. The ends of the phase windings are connected respectively to junctions 16B, 18B and 20B. The phase winding taps 16A, 18A and 20A can be arranged such that the voltage between the neutral 15 and a given tap is about one-third of the voltage between the neutral 15 and an end of a given phase winding. Thus, by way of example, the voltage between the neutral 15 and tap 16A can be about one-third of the voltage between the neutral 15 and the end 16B of phase winding 16. Thus, in terms of the number of stator winding turns, if the number of turns between neutral 15 and tap 16A is N turns, the number of turns between tap 16A and junction 16B would be 2N turns. The same relationship holds true for the other taps 18A and 20A.

The system of this invention has a three phase full-wave bridge rectifier or converter 22 comprised of six controlled rectifiers 24, 26, 28, 30, 32 and 34. The cathodes of controlled rectifiers 24, 26 and 28 are connected to a conductor 36 which forms the positive direct voltage output terminal or line for bridge rectifier 22. The anodes of controlled rectifiers 30, 32 and 34 are connected to a conductor 38 which is grounded. Conductor 38 is the negative direct voltage output terminal or line for bridge rectifier 22.

Bridge rectifier 22 has alternating current input terminals 40, 42 and 44. Terminal 40 is connected to junction 16B by conductor 46. In a similar fashion, terminal 42 is connected to junction 18B by conductor 48 and terminal 44 is connected to junction 20B by conductor 50.

The conductor 36 is connected to a positive power supply conductor 52 on a motor vehicle. A storage battery 54 for the motor vehicle electrical system has its positive side connected to conductor 52. The negative side of battery 54 is grounded. The battery 54 may be a twelve-volt motor vehicle storage battery. Conductor 52 is connected to a conductor 56 which feeds various other motor vehicle electrical loads 58 on the vehicle. A switch 60 is illustrated for controlling the energization of vehicle electrical load 58.

It can be appreciated that whenever bridge rectifier 22 is enabled, it will rectify the AC voltages generated in phase windings 16, 18 and 20 and will develop a direct voltage between conductors 36 and 38. Further, as will be explained in more detail hereinafter, the conduction angle of controlled rectifiers 24-34 is controlled so that the direct voltage appearing between conductors 36 and 38 is maintained at a substantially constant value of about fourteen volts irrespective of rotor speed. In this regard, the voltage generated in the phase windings 16, 18 and 20 varies as a function of engine and rotor speed and it therefore is necessary to control the direct voltage output of bridge rectifier 22 to provide a substantially constant direct voltage output for battery 54 and the other motor vehicle loads. It can be appreciated that while bridge rectifier 22 is enabled or in operation the entire phase windings 16, 18 and 20 carry current and are being utilized.

The system of this invention has another three phase full-wave bridge rectifier or converter designated as 62. This bridge rectifier is comprised of six controlled rectifiers 64, 66, 68, 70, 72 and 74. The cathodes of controlled rectifiers 64, 66, and 68 are connected to conductor 76 which forms the positive direct voltage output terminal or line for bridge rectifier 62. The anodes of controlled rectifiers 70, 72 and 74 are connected to a conductor 78 which is grounded. Conductor 78 forms the negative direct voltage output terminal or line for bridge rectifier 62.

The bridge rectifier 62 has alternating current input terminals 80, 82 and 84. Terminal 80 is connected to tap 16A on phase winding 16 by conductor 86. Terminal 82 is connected to tap 18A on phase winding 18 by conductor 88. Terminal 84 is connected to tap 20A on phase winding 20 by conductor 90.

The positive direct voltage output conductor 76 of bridge rectifier 62 is connected to conductor 52 by conductor 92. Accordingly, when bridge rectifier 62 is enabled or operational, the direct voltage output of bridge rectifier 62 is applied to battery 54 and electrical load 58. The conduction angle of controlled rectifiers 64–74 is controlled in a manner to be described to maintain the direct output voltage of bridge rectifier 62 at a constant value of about fourteen volts. For a given engine and rotor speed the voltage applied to the AC input terminals of bridge rectifier 62 will be lower than the voltage applied to the AC input terminals of bridge rectifier 22. Further, when bridge rectifier 62 is operational and bridge rectifier 22 cut-out or disabled, only those portions of the phase windings between taps 16A, 18A and 20A and the neutral 15 carry current.

The system operates such that only one of the two bridge rectifiers 22 or 62 is enabled or operational at a time. Putting it another way, when one bridge rectifier is operational, the other one is turned-off and vice-versa.

The bridge rectifier that is selectively enabled depends on the magnitude of the speed of engine 13 and rotor 12. Below a certain predetermined engine and rotor speed, bridge rectifier 22 is enabled and bridge rectifier 22 is turned-off or disabled. Above the predetermined engine and rotor speed bridge rectifier 62 is enabled and bridge rectifier 22 is turned-off or disabled. The enabling or disabling of a bridge rectifier is accomplished by selectively applying or cutting-off the gate signals to the controlled rectifiers of the bridge rectifiers in a manner to be described.

When only bridge rectifier 22 is operational, the entire phase windings 16, 18 and 20 are being utilized and are in the circuit. When only bridge rectifier 62 is operational, only those portions of the phase windings between tap points 16A, 18A and 20A and neutral 15 are being utilized. When only bridge rectifier 62 is operational there is no current flow through portions of the phase windings that are between a tap 16A, 18A or 20A and a corresponding end 16B, 18B or 20B of the phase windings 16, 18 and 20.

The system of this invention has a controlled rectifier firing angle control or controlled rectifier firing pulse generator 100 which operates to control the conduction angle of the controlled rectifiers of the bridge rectifiers 22 or 62. Since controlled rectifier firing angle controls are known to those skilled in the art, control 100 has not been shown in detail. The firing pulse generator 100 receives input voltages via three input lines each designated as 102.

The conductors or lines 102 are respectfully connected to three lines or conductors each designated as 103. The lines 103 connect the output of a signal conditioner circuit 104 and the input of a frequency to voltage converter 105. The output of converter 105 is connected to a line or conductor 106. The converter 105 provides a voltage on line 106 that is inversely proportional to the frequency of the voltage pulses on lines 103.

The input of signal conditioner 104 is respectively connected to the ends 16B, 18B and 20B of phase winding 16, 18 and 20 by three conductors or lines each designated as 107. The AC voltages generated in the phase windings are therefore applied to the input of signal conditioner 104. The signal conditioner 104 produces a series of square wave pulses that are applied to lines 103. Each square wave pulse is developed during a positive half-cycle of an input AC phase voltage from the phase windings 16, 18 and 20. AC phase voltage from the phase windings 16, 18 and 20. The frequency of the square wave pulses on lines 103 is directly proportional to the frequency of the alternating voltage generated in phase windings 16, 18 and 20 which, in turn, is directly proportional to the speed of rotation of rotor 12.

The voltage on line 106 is applied to one input of the firing pulse generator 100 by conductor 109 and to one input of a voltage comparator 108. The other input of voltage comparator 108 is connected to a source of constant reference direct voltage 111. The purpose of the voltage comparator 108 will be described hereinafter.

The system of this invention has an error amplifier 110. One input of amplifier 110 is connected to a junction 112 between voltage divider resistors 114 and 116. Resistors 114 and 116 sense the direct voltage between conductor 52 and ground and the voltage at junction 112 therefore is a function of the voltage between conductor 52 and ground.

The other input to amplifier 110 is connected to a source of constant reference direct voltage 118. The magnitude of the output voltage of amplifier 110 that is applied to line 119 depends upon the difference between the reference voltage 118 and the voltage at junction 112. The line 119 is connected to an input of the pulse generator 100. If it is assumed it is desired to maintain a voltage of fourteen volts between conductor 52 and ground, the signal developed by amplifier 110 on line 119 will, if the voltage between conductor 52 and ground is above fourteen volts, tend to reduce the conduction angle of the controlled rectifiers by means of pulse generator 100. If the voltage between conductor 52 and ground 15 is below fourteen volts, the signal on line 119 developed by amplifier 110 tends to increase the conduction angle of the controlled rectifiers of the bridge rectifiers by means of pulse generator 100.

The output of controlled rectifier firing angle control 100 is connected to six conductors which are collectively designated as 120. These six conductors are connected as inputs to a gate pulse steering or switching circuit 122. Switching circuit 122 is connected to two sets of output lines or conductors. The first set is comprised of conductors 24A, 26A, 28A, 30A, 32A and 34A. These conductors are respectively connected to the gates of controlled rectifiers 24-34 by conductors that are not illustrated.

The other set of output conductors are conductors 64A, 66A, 68A, 70A, 72A and 74A. These conductors are connected respectively to the gates of controlled rectifiers 64-74 by conductors that are not illustrated.

The purpose of gate signal steering or switching circuit 122 is to connect lines 120 to lines 26A-34A or to lines 64A-74A to thereby selectively apply gate signals to the gates of the controlled rectifiers of the bridge rectifiers 22 and 62. To simplify the drawings, only one switch is shown in switching circuit 122. This switch is comprised of a movable contact 124 which can engage either fixed contact 126 or 128. Movable contact 124 is shifted by a relay coil 130 that is connected to a conductor 132.

In the position of the movable contact 124 shown in the FIG. 1, conductors 120A and 24A are connected by switching circuit 122. If contactor 124 is shifted into engagement with fixed contact 128, conductor 120A is disconnected from conductor 24A and is connected to conductor 64A. It will, of course, be appreciated that six contactors, like contactor 124 and associated fixed contacts, are required to selectively connect and disconnect conductors 120 to and from the sets of conductors 24A-34A or 66A-74A. From what has been described, it can be appreciated that switching circuit 122 will apply gate signals to the controlled rectifiers of one of the bridge rectifiers 22 or 62 and will cut off the gate signals to the controlled rectifiers of the other bridge rectifier.

The switching circuit 122 is controlled as a function of the speed of rotation of rotor 12 and its speed varies with changes in the speed of engine 13. To this end, the conductor 132 is connected to the output of voltage comparator 108.

The voltage comparator 108 compares the direct voltage on line 106 with the constant direct reference voltage provided by source 111. The magnitude of the voltage on line 106, as previously described, is inversely proportional to the speed of rotation of rotor 12. The output of comparator 108 on line 132 goes high and low dependent upon the speed of rotation of rotor 12.

When engine speed, and accordingly the speed of rotor 12, is below a predetermined speed the output of the comparator 108 on line 132 is low. Accordingly, relay coil 130 is not energized and contact 124 engages fixed contact 126. Therefore, at engine and rotor speeds below a predetermined speed, switching or steering circuit 122 applies gate signals to the gates of the controlled rectifiers of bridge rectifier 22 and cuts-off the application of gate signals to the gates of the controlled rectifiers of bridge rectifier 62. Accordingly, bridge rectifier 22 is enabled and bridge rectifier 62 is disabled.

When engine speed and hence the speed of rotor 12 is higher than the predetermined speed, the output of comparator 108 goes high thereby energizing relay coil 130. Movable contact 124 is now shifted into engagement with fixed contact 128. Gate signals are now applied to the gates of the controlled rectifiers of bridge rectifier 62 and gate signals to the gates of the controlled rectifiers of bridge rectifier 22 are cut-off. Accordingly bridge rectifier 62 is enabled and bridge rectifier 22 is disabled.

The switching or gate pulse steering circuit 122 can take various forms other than relay contacts and a relay coil. Thus, circuit 122 can be formed of semiconductor switches and suitable logic circuitry for performing the switching or pulse steering function. Further, various known speed detecting circuits other than the one described can be used to control the switching of switching circuit 122.

To further explain the operation of this invention, let it be assumed that the number of turns per phase between neutral 15 and a junction like junction 16B is N. Further, let it be assumed that the number of turns per phase, between neutral 15 and a tap like tap 16A is N1. The ratio of N to N1 is selected to depend upon the ratio of maximum engine speed to idle speed. The full winding N is designed to give nominal direct output voltage from bridge rectifier 22 with a minimum delay angle of the controlled rectifiers of bridge rectifier 22 to improve the power factor at engine idle speed. As the engine speed increases, the delay angle increases in order to keep the output voltage constant. The other winding set (N1 turns per phase) is designed to give the nominal direct voltage output of bridge rectifier 62 with minimum delay angle at N/N1 times engine idle speed.

The system is arranged such that the bridge rectifier or converter 22 is operational from engine idle speed to an engine speed of N/N1 multiplied by engine idle speed. Thus, if N/N1=3 and engine idle speed is 650 RPM, converter 22 is operational up to an engine speed of 1950 RPM and bridge rectifier 62 is disabled. When engine speed exceeds 1950 RPM, converter 22 is disabled and converter 62 is enabled. Due to this operation, the copper loss in the machine decreases by a factor N/N1 as compared to a system that uses one full stator winding with N turns per phase with one controlled rectifier bridge rectifier.

FIG. 2 illustrates a modification of the system shown in FIG. 1. In FIG. 2, the bridge rectifier or converter 62 has been modified by replacing controlled rectifiers 70-74 with diodes 150, 152 and 154. In this modification of the system, the bridge rectifier 22 would use six controlled rectifiers as shown in FIG. 1. Further, the system could be arranged such that the controlled rectifiers 30-34 of the bridge rectifier 22 would be replaced by diodes. With this arrangement, bridge rectifier 22 would be comprised of three controlled rectifiers and three diodes and bridge rectifier 62 would be comprised of six controlled rectifiers.

The disadvantage of using bridge rectifiers that are comprised of three controlled rectifiers and three diodes is that the ripple voltage at the direct voltage output terminals of a bridge rectifier is increased.

When a bridge rectifier is used that has three controlled rectifiers and three diodes, only three gate signal lines are used for the three controlled rectifiers.

It has been pointed out that conductor 106 is connected to one input of firing pulse generator by conductor 109. This conductor applies a voltage to phase locked loop that is part of the firing pulse generator.

At the expense of some reiteration, the firing pulse generator or controlled rectifier firing angle control 100 varies the firing angle of the controlled rectifiers of the bridge rectifiers 22 and 62 as a function of the voltage developed on line 119 to thereby maintain the output voltage of the bridge rectifier that is enabled substantially constant.

Some of the advantages of this invention, as compared to systems that use one output or stator winding and one bridge rectifier, are the reduction in stator winding copper loss and improved power factor. Further, since the copper loss is reduced there is less heat generated in the stator winding.

The embodiments of the invention in which an exclusive property or privilege is claimed are defined as follows:

1. An electrical system comprising in combination, a permanent magnet alternating current generator having a rotor and a polyphase output winding, said polyphase output winding being comprised of first and second winding sets, said first winding set having a larger number of turns per phase than said second winding set, a first full wave bridge rectifier comprised of a plurality of first controlled rectifiers, said first bridge rectifier having direct voltage output terminals and Ac input terminals, first conductors connecting said first winding set to said AC input terminals of said first bridge rectifier, a second full wave bridge rectifier comprised of a plurality of second controlled rectifiers, said second bridge rectifier having direct voltage output terminals and AC input terminals, second conductors connecting said second winding set to said AC input terminals of said second bridge rectifier, means responsive to the speed of rotation of said rotor for enabling said first bridge rectifier and disabling said second bridge rectifier when the speed of said rotor is below a predetermined speed and operative to enable said second bridge rectifier and disable said first bridge rectifier when the speed of said rotor is higher than said predetermined speed, voltage sensing means connected to the direct voltage output terminals of said bridge rectifiers for sensing the direct voltage output of said bridge rectifiers, and means responsive to the magnitude of the direct voltage output sensed by said voltage sensing means for controlling the conduction of the controlled rectifier of said first or second bridge rectifier that is enabled in such a manner as to maintain the direct output voltage of that bridge rectifier substantially constant.

2. The system according to claim 1 where the means for enabling and disabling the bridge rectifiers comprises means for selectively applying or cutting-off the supply of gate signals to the controlled rectifiers of the respective bridge rectifiers.

3. The system according to claim 1 where the bridge rectifiers supply direct voltage loads on a motor vehicle and where said rotor is driven by the engine of said vehicle.

4. The system according to claim 1 where the first bridge rectifier and the second bridge rectifier are comprised entirely of controlled rectifiers.

5. The system according to claim 1 where one of said first and second bridge rectifiers is comprised of a plurality of controlled rectifiers and a plurality of diodes and where the other of said first and second bridge rectifiers is comprised entirely of controlled rectifiers.

6. The system according to claim 1 where the means responsive to the speed of rotation of said rotor comprises means that responds to the frequency of voltage generated in said output winding.

7. An electrical system comprising in combination, a permanent magnet alternating current generator having a rotor and a three phase Y-connected output winding comprised of a plurality of phase windings, the phase windings of said output winding being connected respectively to output terminals, said phase windings each being connected to a tap, each said tap being located between the neutral of said output winding and one of said output terminals whereby the number of turns per phase between said neutral and a said tap is less than the number of turns per phase between said neutral and said one of said output terminals, a first three phase full wave bridge rectifier comprised of a plurality of first controlled rectifiers, said first bridge rectifier having AC input terminals and direct voltage output terminals, first conductors connecting said output terminals of said phase windings to said AC input terminals of said first bridge rectifier, a second three phase full wave bridge rectifier comprised of a plurality of second controlled rectifiers, said second bridge rectifier having AC input terminals and direct voltage output terminals, second conductors connecting said taps on said phase windings to said AC input terminals of said second bridge rectifier, means responsive to the speed of rotation of said rotor for enabling said first bridge rectifier and disabling said second bridge rectifier when the speed of said rotor is below a predetermined speed and operative to enable said second bridge rectifier and disable said first bridge rectifier when the speed of said rotor is higher than said predetermined speed, voltage sensing means connected to the direct voltage output terminals of said bridge rectifiers for sensing the direct voltage output of said bridge rectifiers, and means responsive to the magnitude of the direct voltage output sensed by said voltage sensing means for controlling the conduction of the controlled rectifiers of said first or second bridge rectifier that is enabled in such a manner as to maintain the direct output voltage of that bridge rectifier substantially constant.

8. The system according to claim 7 where the means for enabling and disabling the bridge rectifiers comprises means for selectively applying or cutting-off the supply of gate signals to the controlled rectifiers of the respective bridge rectifiers.

9. The system according to claim 7 where the bridge rectifiers supply direct voltage loads on a motor vehicle and where said rotor is driven by the engine of said vehicle.

10. The system according to claim 7 where each bridge rectifier is comprised entirely of controlled rectifiers.

11. The system according to claim 7 where one of said first and second bridge rectifiers is comprised of a plurality of controlled rectifiers and a plurality of diodes and where the other of said first and second bridge rectifiers is comprised entirely of controlled rectifiers.

12. The system of claim 7 where the means responsive to the speed of rotation of said rotor comprises means that responds to the frequency of voltage generated in said output winding.

* * * * *